(12) United States Patent
Huang et al.

(10) Patent No.: US 8,069,448 B2
(45) Date of Patent: Nov. 29, 2011

(54) COMPUTER INTERFACE CONTROLLER FOR PERIPHERAL DEVICES

(75) Inventors: Cheng-Hung Huang, Taipei County (TW); I-Chieh Chang, Taipei County (TW)

(73) Assignee: Tenx Technology Inc., Banciao, Taipei County (TW)

( * ) Notice: Subject to any disclaimer, the term of this patent is extended or adjusted under 35 U.S.C. 154(b) by 828 days.

(21) Appl. No.: 12/213,632

(22) Filed: Jun. 23, 2008

(65) Prior Publication Data

US 2009/0055841 A1 Feb. 26, 2009

(30) Foreign Application Priority Data

Aug. 20, 2007 (TW) ................................ 96213815 U

(51) Int. Cl.
*G06F 3/00* (2006.01)
*G06F 21/00* (2006.01)

(52) U.S. Cl. ........................................ 719/310; 713/182
(58) Field of Classification Search .................. 719/310; 713/182
See application file for complete search history.

(56) References Cited

U.S. PATENT DOCUMENTS

2002/0083228 A1* 6/2002 Chiloyan et al. .................. 710/9
2008/0269572 A1* 10/2008 Kanz et al. ..................... 600/301

OTHER PUBLICATIONS

Yangmin Seo, Supporting Preemtive User-Level Threads for Embedded Real-Time Systems, 1998.*

* cited by examiner

*Primary Examiner* — Lechi Truong
(74) *Attorney, Agent, or Firm* — Bacon & Thomas, PLLC

(57) ABSTRACT

Provided is a computer interface controller for peripheral devices, comprising a computer interface control unit, a central control unit, a driver program memory, a virtual optical disc drive control unit, a data transmission unit and a data interruption unit. The central controller is connected to the computer interface control unit and the driver program memory is connected to the central controller. The data transmission unit and the data interruption unit are connected to the computer interface control unit. The computer interface controller selects a proper data transmission mode according to the user authorization information provided by the computer device in correspondence with the user of the peripheral in connection with the invented computer interface controller.

16 Claims, 2 Drawing Sheets

COMPUTER INTERFACE CONTROLLER FOR PERIPHERAL DEVICES

FIELD OF THE INVENTION

The present invention relates to a computer interface controller for peripheral devices that is able to automatically determine the authorization level of a user and select the data transmission mode of the peripheral device in connection with the computer interface controller. When the peripheral device in connection with the invented computer interface controller of this invention is in connection with the computer device, the computer interface controller of this invention will automatically determine the authorization level given to the user of the peripheral, as is registered in the computer device, and select the data transmission mode between the peripheral device and the computer device according to the authorization policy provided in the operation system of the computer device.

BACKGROUND OF THE INVENTION

In the application of the peripheral devices of the computer system, the computer interface controller for the peripheral devices plays an important role. All kinds of the portable devices need to exchange data with the computer device through the computer communication interfaces, such as the USB interface, the PCMCIA interface, the CardBus interface, the SATA interface etc.

Currently the peripheral devices available in the market are designed to operate passively. That is, when a user uses the peripheral device in connection with a computer, the computer will provide an authorization level to the user according to the user name and authorization level registered in the operation system of the computer device and select the data transmission mode between the computer device and the peripheral device according to the given authorization level.

This information security policy, however, does not apply to the peripheral devices that are connected to the back end of the computer device. This is because the peripheral devices that are connected to the back end of the computer device are not able to determine the authorization level that the current user has registered in the operation system of the computer device. As a result, the computer device can not select the proper data transmission mode in connection with the peripheral device, according to the authorization level given to the user of the peripheral device.

It is thus necessary to provide a technology to enable the peripheral device to select the proper data transmission mode from time to time according to the authorization level given to the user of the peripheral device, as is registered in the operation system of the computer device. With such a technology, the security of the computer system will be further enhanced.

OBJECTIVES OF THE INVENTION

The objective of the invention is to provide a computer interface controller for peripheral devices to automatically select the data transmission mode between the computer interface controller and the computer device according to the authorization level given to the user of the peripheral device and registered in the operation system of the computer device.

Another objective of this invention is to provide a data transmission system which is able to determine the authorization level of a user in the operation system of the computer device and select the proper data transmission channel.

Another objective of this invention is to provide a computer interface controller for peripheral devices to automatically select the data transmission mode between a peripheral device and the computer device according to the authorization level registered by the user of the peripheral device in the operation system of the computer device.

Another objective of the invention is to provide a computer interface controller for peripheral devices in which a plurality of data transmission interfaces is provided.

SUMMARY OF THE INVENTION

To realize the above objectives, the computer interface controller for peripheral devices of this invention is used to connect a peripheral device to the computer device and comprises: A computer interface control unit, a central control unit, a driver program memory, a virtual optical disc drive control unit, a bulk data upload/download node unit and a data upload/download interruption node unit. In them, the central control unit is in connection with the computer interface control unit. The virtual optical disc drive control unit is in connection with the computer interface control unit. The driver program memory is in connection with the central control unit. The bulk data upload/download node unit and the data upload/download interruption node unit are in connection with the computer interface control unit.

The computer interface control unit is used to communicate with a computer device through a computer communication interface. The central control unit is used to control the application functions of the computer interface control device and to process and to transmit data and information. The driver program memory is in connection with the central control unit and is used to store the driver programs of the computer interface control device in the central control unit. The bulk data upload/download node unit serves as the data transmission channel for bulk data transmission. The data upload/download interruption node unit serves to interrupt the data transmission. The virtual optical disc drive control unit is used to announce to the computer device the identity of the computer interface control unit as an optical disc drive, whereby a user authorization application program stored in an external memory is uploaded to the computer device through the communication channel created by the announced optical disc drive, to be executed in the computer device. The user authorization application program is a computer program designed to conduct the communication between the announced optical disc drive and the computer device, so to drive the computer interface controller for peripheral devices of this invention and to control the data transmission activities of the data transmission nodes.

When the peripheral device is in connection with the computer device, the computer interface controller for peripheral devices of this invention will announce an optical disc drive to the computer device. After the communication channel for the announced optical disc drive is established, a user authorization application program stored in the external memory is provided to the computer device. The computer device then executes the user authorization application program and the program will determine by reading out the authorization level information relating to the user of the peripheral device, registered in the operation system of the computer device, and select the proper data transmission mode between the invented computer interface controller for peripheral devices and the computer devices.

In addition, the present invention also discloses a data transmission system, comprising a computer device, a computer interface controller for peripheral devices, an external memory and a peripheral device. In them, the computer interface controller for peripheral devices comprises: A computer interface control unit, a central control unit, a driver program memory, a virtual optical disc drive control unit, a bulk data upload/download node unit, a data upload/download interruption node unit and a bidirectional data transmission interface unit.

In this data transmission system the computer device comprises a computer communication interface. In the computer interface controller for peripheral devices the driver memory is in connection with the central control unit. The central control unit, the virtual optical disc drive control unit, the bulk data upload/download node unit and the data upload/download interruption node unit are in connection with the computer interface control unit. In addition, the bidirectional data transmission interface unit is in connection with the central control unit, the virtual optical disc drive control unit, the bulk data upload/download node unit and the data upload/download interruption node unit.

One important technical feature of the invented data transmission system is in that the computer executes a user authorization application program stored in an external memory and that the user authorization application program will determine the authorization level of the user of the peripheral device in the computer device and select one or both of the bulk data upload/download node unit and the data upload/download interruption node unit as the data transmission mode for the peripheral device.

In another embodiment, the external memory is in connection with the bidirectional data transmission interface unit and stores the user authorization application program. One important technical feature of this embodiment is in that the computer executes a user authorization application program stored in an external memory and that the user authorization application program will determine the authorization level of the user of the peripheral device in the computer device and select the data transmission mode for the peripheral device.

The compute interface controller for peripheral devices of the present invention selects the data transmission mode according to the authorization information of a user in the computer device. The compute interface controller for peripheral devices of the present invention may be used in any peripheral device, preferably a portable peripheral device and more preferably a portable plug-and-play peripheral device. In addition, the central control unit in this invention may be a microcontroller or a microprocessor.

The bulk data upload/download node unit in this invention may be a bulk data upload node or a bulk data download node. If it is a bulk data upload/download node, it may provide the function of announcing to the computer device the identity of the compute interface controller for peripheral devices as a control data peripheral device that is able to write in and read out the bulk data to and from the peripheral device.

The data upload/download interruption node unit in this invention may be a data upload interruption node or a data download interruption node. If it is a data upload/download interruption node, it may provide the function of announcing to the computer device the identity of the compute interface controller for peripheral devices as a control data peripheral device that is able to interrupt the write-in and the read-out of data to and from the peripheral device.

The virtual optical disc drive control unit in this invention may be a storage unit, such as an optical disc drive, a portable hard disc drive, a memory card, a memory stick or a magnetic disc.

The compute interface controller for peripheral devices of the present invention may further comprise a bidirectional data transmission interface unit in connection with the virtual optical disc drive control unit, the bulk data upload/download node unit and the data upload/download interruption node unit. The bidirectional data transmission interface unit comprises at least one embedded data transmission interface, which may be the SPI interface, the NAND flash control interface the NOR flash control interface, the SmardCard reader interface, the UART interface, the GPIO interface or their combinations.

The computer device suited in the present invention is not limited to the server, the personal computer, the notebook computer and other devices that are generally called the "computer" but also includes other machines that use the structure of the computer device and provide the similar functions of the computer device, including the personal digital aid, the portable phone, the electronic dictionary and other multimedia A/V devices.

The computer communication interface suited in the present invention may be a wired interface or a wireless interface. If it is a wired interface, it may be the USB interface, the PCMCIA interface, the CardBus interface, the IEEE 1394 interface or the PCI interface. If it is a wireless interface, it may be the infrared interface, the BlueTooth interface or the radio interface.

In the embodiments of the present invention, the computer communication interface is the USB interface, whereby the peripheral device is a USB device.

These and other objectives and advantages of the present invention may be clearly understood from the detailed description by referring to the following drawings.

DETAILED DESCRIPTION OF THE INVENTION

Figure 1:
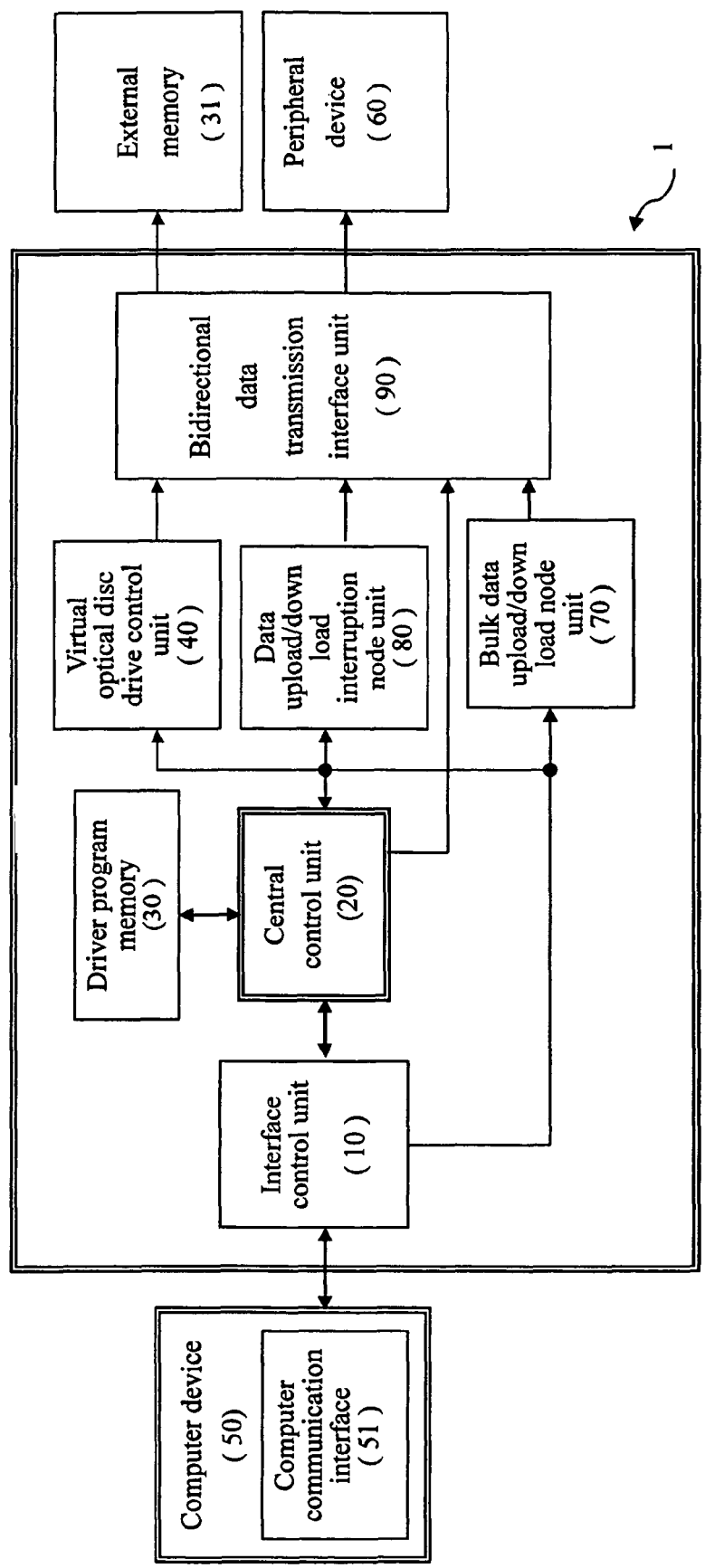
FIG. 1 shows the system diagram of the compute interface controller for peripheral devices of the present invention.

In the followings the detailed description to the embodiments of the compute interface controller for peripheral devices of the present invention will be given. FIG. 1 shows the system diagram of the compute interface controller for peripheral devices of the present invention. As shown in this figure, the compute interface controller for peripheral devices 1 of the present invention is used with a peripheral device 60, to connect the peripheral device 60 to a computer device 50 and to control the communication between the peripheral device 60 and the computer device 50 through the computer communication interface 51. The "computer device" that the present invention may work with is not limited to the server, the personal computer, the notebook computer and other devices that are generally called the "computer" but also includes other machines that use the structure of the computer device and provide the similar functions of the computer device, including the personal digital aid, the portable phone, the electronic dictionary and other multimedia A/V devices.

The computer interface controller for peripheral devices 1 of this invention comprises: A computer interface control unit 10, a central control unit 20, a driver program memory 30, a virtual optical disc drive control unit 40, a bulk data upload/download node unit 70, a data upload/download interruption node unit 80 and a bidirectional data transmission interface unit 90.

In the computer interface controller 1, computer interface control unit 10 is used to communicate with the computer device 50 through the computer communication interface 51. The central control unit 20 is used to control the peripheral interfacing functions of the computer interface control device 10 and to process and to transmit data and information. The driver program memory 30 is used to store the driver programs for the central control unit 20.

The bulk data upload/download node unit 70 serves as the data transmission channel for bulk data transmission. The data upload/download interruption node unit 80 serves to interrupt the data transmission. The virtual optical disc drive control unit 40 is used to announce to the computer device 50 the identity of the computer interface control unit 1 as an optical disc drive. In addition the virtual optical disc drive control unit 40 uses the external memory 31 as the optical disc drive that it announces to the computer device 50 to communicate with the computer device 50. Using this communication channel, the virtual optical disc drive control unit 40 provides to the computer device 50 a user authorization application program stored in the external memory 31, to be executed by the computer device 50, in order to drive the peripheral device 60 and to control the bulk data upload/download node unit 70 and the data upload/download interruption node unit 80.

In the above device, the computer communication interface 51 that is in connection with the computer interface controller 1 may be the USB interface. This is because the USB interface is the most popular computer communication interface in the industry. However, other standard computer communication interface, including the wired interface such as the PCMCIA interface, the CardBus interface, the IEEE 1394 interface, the PCI interface etc. and the wireless interface such as the infrared interface, the BlueTooth interface and the radio interface, are all applicable in this invention.

The central control unit 20 may be any commercially available microcontroller or microprocessor. In the present embodiment, the role of the central control unit 20 is to process the data generated by the computer interface controller 1, to conduct all necessary operations and to output to the external interfaces. In addition, the virtual optical disc drive control unit 40 and the user authorization application program stored in the external memory 31 are the major features of this invention. The virtual optical disc drive control unit 40 announces to the computer device 50 the existence of an optical disc drive, so that a communication channel provided for the announced optical disc drive is generated by the computer device 40 in response to the announcement. Thereafter, the user authorization application program stored in the external memory is provided to the computer device 50. At the same time, the driver program of the peripheral device 60 is also provided to the computer device 50. When the user authorization application program is executed in the computer device 50 in the operation system, the application program identifies the user of the peripheral device and obtains the authorization level information that the identical user registered in the operation system of the computer device. The user authorization application program thus selects one or both of the bulk data upload/download node 70 and the data upload/download interruption node 80 as the data transmission channel of the computer interface controller 1, according to and in correspondence with the user authorization information.

In one embodiment of the present invention, the driver program memory 30 may be any memory module that may be used in the controller IC and may be a read only memory or a rewritable memory. In another embodiment, the user authorization application program is stored in the external memory 31. In this case, the virtual optical disc drive control unit 40 uses the external memory 31 as the optical disc of the optical disc drive announced to the computer device 50. In the announced optical disc drive the programs executable by the computer device 50 are stored and are provided to the computer device 50 as if the files stored in an optical disc drive. The external memory 31 may be a serial flash memory, an NAND flash memory, an NOR flash memory or a memory card.

Under the above-described mechanism, the optical disc drive announced to the computer device 50 by the virtual optical disc drive control unit 40 may be an optical disc drive, a portable hard disc drive, a memory card, a memory stick, a magnetic disc etc. The virtual optical disc drive control unit 40 uses the user authorization application program to complete the communication interface protocol negotiations between the peripheral device 60 and the computer device 50. The flowchart of the protocol negotiation is shown in FIG. 2.

Figure 2:
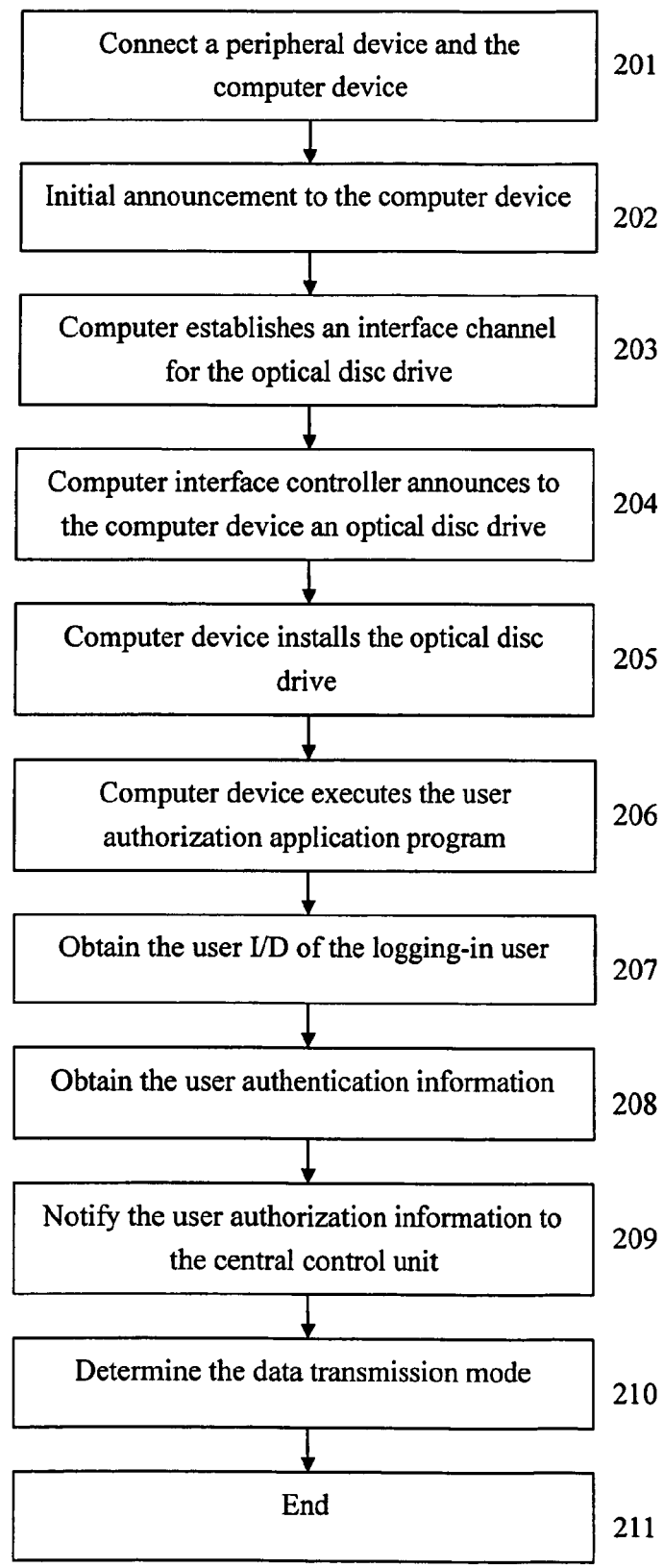
FIG. 2 is the flowchart for the communication protocol negotiation of the computer interface controller for peripheral devices of the present invention.

FIG. 2 is the flowchart for the communication protocol negotiation of the computer interface controller for peripheral devices of the present invention. In this figure, the computer communication interface is the USB interface, therefore the peripheral device is a USB device. As shown in FIG. 2, the authorization level of the user of the peripheral device is determined pursuant to the following steps:

At 201 the user uses the computer interface controller for peripheral device of this invention to connect a peripheral device 60 and the computer device 50. At 202 the computer interface controller 1 starts the initial announcement to the computer device 50. In the embodiment of the present invention, the computer interface controller 1 announces a plurality of data transmission node units to the computer device, including the USB data transmission interruption node, the USB bulk data transmission node and the interface channel for the virtual optical disc drive controller. Other methods that are able to establish the communication channel between computer interface controller and the computer device may be used in the present invention, too.

Upon the receipt of the above announcement, at 203 the computer establishes an interface channel for the optical disc drive. At 204 the computer interface controller announces to the computer device 50 an optical disc drive. At 205 the computer device 50 installs the optical disc drive as announced. At 206 the computer device 50 automatically executes the user authorization application program stored in the driver program memory 30. At 207 the computer device obtains the user identification information of the user logging in with the operation system. At 208 the computer device 50 obtains the user authorization information of the same user identification registered in the operation system of the computer device. At 209 the computer uses the user authorization application program to notify the central control unit 20 the user authorization information.

In the application, it is possible to prepare a simple user authorization application program in the program memory 30. When executed, the user authorization application program reads out the user authorization information provided in the operation system of the computer device 50 and provides the user authorization information to the computer interface controller 1 through the communication interface 51, so that the computer interface controller 1 may choose the data transmission mode according to the user authorization level specified in the user authorization information. In general, the user authorization application program may be activated automatically by the autorun program (autorun.inf) provided in the operation system of the computer device 50 or provided to and executed by the computer device 50 using a storage device such as a memory card, a optical disc etc.

In the operation system of the computer device, such as the Windows® system, the user authorization function is provided. The user authorization function provides the user authorization level information, in which all users are divided into several levels, including the administrator, the ordinary user and the special user. Different access functions are provided to users according to their user authorization levels. For example, while an administrator is allowed to access data files, modify file settings and functional settings and move data files and program files, an ordinary user is given the authorization only to access the data files and is not allowed to modify any settings or move any file. Such functions are known to those skilled in the art and detail descriptions thereof are omitted. With such user authorization function provided in the computer device 50, the computer interface controller for peripheral devices of this invention is able to determine the user authorization level of the user of the peripheral and select the data transmission mode accordingly.

The selection of the data transmission nodes in this invention is performed by the user authorization application program when executed in the computer device 50. Therefore, as described above, at 206 the computer device 50 executes the user authorization application program. At 207 the user authorization application program obtains the user identification information of the user in the operation system of the computer device 50. At 208 the computer device 50 reads out the user authentication information corresponding to the user identification in the operation system and provides the information to the central control unit 20 at 209. At 210 the computer interface controller 1 determines the data transmission mode to be through the USB bulk data transmission node 70 or the USB data transmission interruption node 80, or both. At 211 the selection of the data transmission mode is completed and the data transmission between the computer device 50 and the computer interface controller 1 for the back end peripheral device 60 is optimized.

By using the invented computer interface controller for peripheral devices, the proper data transmission mode may be selected in the operation system of the computer device, according to the authorization level of the user. The user authorization application program automatically completes all the complicated operations in selecting the optimal modes in the data transmission. The user authorization application program may also be combined with other application programs, whereby the other application programs may utilize the advantageous features of the present invention. The computer interface controller for peripheral devices is thus useful in all kinds of the peripheral devices in their communication with all kinds of the computer devices.

As the present invention has been shown and described with reference to preferred embodiments thereof, those skilled in the art will recognize that the above and other changes may be made therein without departing form the spirit and scope of the invention.

What is claimed is:

1. A computer interface controller for peripheral devices to control an exchange of data among a peripheral device, an external memory and a computer device, the computer interface controller comprising:
    a computer interface control unit, to communicate with the computer device through a computer communication interface;
    a central control unit in connection with the computer interface control unit, to control a peripheral interfacing application functions of the computer interface controller, to process data and to deliver information;
    a driver program memory in connection with the central control unit, to store driver programs to be used by the central control unit;
    a bidirectional data transmission interface unit in connection with the central control unit, to communicate with the external memory and the peripheral device;
    a bulk data upload/download node unit in connection with the central control unit, to transmit data;
    a data upload/download interruption node unit in connection with the central control unit, to interrupt data transmission; and
    a virtual optical disc drive control unit in connection with the central control unit, to announce to the computer device an identification of the computer interface control unit as an optical disc drive and to use the external memory as the announced optical disc drive, whereby the external memory communicates with the computer device through a communication channel that the computer device creates for the announced optical disc drive;
    wherein the external memory provides a user authorization application program to the computer device to enable the computer device to drive the peripheral device and to select a data transmission nodes between the computer interface controller and the computer device, when the user authorization application program is executed;
    wherein the selection of the data transmission nodes includes the steps of: when executing the user authorization application program, the computer device obtains a user authorization information corresponding to the user of the peripheral and stored in the computer device; and
    the computer device selects one or both of the bulk data upload/download node unit and the data upload/download interruption node unit as the data transmission node, according to the obtained user authorization information.

2. The computer interface controller for peripheral devices according to claim 1, wherein the bulk data upload/download unit is one selected from the group consisted of a bulk data transmission unit, a bulk data upload node, a bulk data download node and a bulk data upload/download node.

3. The computer interface controller for peripheral devices according to claim 2, wherein the bulk data upload/download node announces to the computer device an identification of the peripheral device as a control data peripheral device capable of writing-in and reading-out bulk data.

4. The computer interface controller for peripheral devices according to claim 1, wherein the data upload/download interruption node unit is one selected from the group consisted of a data upload/download interruption node, a data upload/download interruption node and a data upload/download interruption node.

5. The computer interface controller for peripheral devices according to claim 4, wherein the data upload/download interruption node announces to the computer device an identification of the peripheral device as a control data peripheral device capable of interrupting the writing-in and reading-out of data.

6. The computer interface controller for peripheral devices according to claim 1, wherein the optical disc drive announced by the virtual optical disc drive control unit is one selected from the group consisted of an optical disc drive, a portable hard disc drive, a memory card, a memory stick and a magnetic disc.

7. The computer interface controller for peripheral devices according to claim 1, wherein the computer communication interface is one selected from the group consisted of a USB interface, a wired communication interface or a wireless communication interface.

8. The computer interface controller for peripheral devices according to claim 7, wherein the wired communication interface is one selected from the group consisted of the PCMCIA interface, the CardBus interface, the IEEE1394 interface, the PCI interface and the SATA interface.

9. The computer interface controller for peripheral devices according to claim 1, further comprising a data transmission node controller to activate the computer to execute an application program stored in the external memory to drive the peripheral device and to control the bidirectional data transmission node to select a data transmission mode of the bidirectional data transmission node.

10. A data transmission system, comprising:
- a computer device, comprising a computer communication interface;
- a peripheral device, in connection with the computer device through the computer communication interface;
- a computer interface controller, to connect the peripheral device and the computer device;
- and an external memory in connection with the computer interface controller, to provide a user authorization application program; wherein the computer interface controller comprising:
- a computer interface control unit, to communicate with the computer device through the computer communication interface;
- a central control unit in connection with the computer interface control unit, to control the peripheral interfacing application functions of the computer interface controller, to process data and to deliver information;
- a driver program memory in connection with the central control unit, to store driver programs to be used by the central control unit;
- a bidirectional data transmission interface unit in connection with the central control unit, to communicate with the external memory and the peripheral device;
- a bulk data upload/download node unit in connection with the central control unit, the bidirectional data transmission interface unit and the computer interface controller unit, to transmit bulk data;
- a data upload/download interruption node unit in connection with the central control unit, the bidirectional data transmission interface unit and the computer interface controller unit, to interrupt data transmission; and
- a virtual optical disc drive control unit in connection with the central control unit, to announce to the computer device an identification of the computer interface control unit as an optical disc drive and to use the external memory as the announced optical disc drive, whereby the external memory communicates with the computer device through a communication channel that the computer device creates for the announced optical disc drive; and to control the data transmission of the bulk data upload/download node unit and the data upload/download interruption node unit;
- wherein the bulk data transmission unit is one selected from the group consisted of a bulk data transmission unit, a bulk data upload node, a bulk data download node and a bulk data upload/download node;
- wherein the bulk data upload/download node announces to the computer device an identification of the peripheral device as a control data peripheral device capable of writing-in and reading-out bulk data.

11. The data transmission system according to claim 1, wherein the computer communication interface is a USB communication interface.

12. The data transmission system according to claim 11, wherein the bulk data upload/download node unit is a USB bulk data upload/download node and the data upload/download interruption node unit is a USB data upload/download interruption node.

13. The data transmission system according to claim 10, wherein the computer communication interface is one selected from the group consisted of a PCMCIA interface, a CardBus interface, a IEEE1394 interface, a PCI interface and a SATA interface.

14. The data transmission system according to claim 10, wherein the computer communication interface is one selected from the group consisted of a infrared interface, a BlueTooth interface and the radio interface.

15. The data transmission system according to claim 10, wherein the data upload/download interruption node unit is one selected from the group consisted of a data upload/download interruption node, a data upload/download interruption node and a data upload/download interruption node.

16. The data transmission system according to claim 15 wherein the data upload/download interruption node announces to the computer device an identification of the peripheral device as a control data peripheral device capable of interrupting a writing-in and reading-out of data.

* * * * *